May 28, 1935. B. WALKER 2,002,724

MOTOR VEHICLE LIFTING AND TRAVERSING DEVICE

Filed May 15, 1931

INVENTOR
Brook Walker

Patented May 28, 1935

2,002,724

UNITED STATES PATENT OFFICE 2,002,724

MOTOR VEHICLE LIFTING AND TRAVERSING DEVICE

Brooks Walker, Piedmont, Calif.

Application May 15, 1931, Serial No. 537,631

2 Claims. (Cl. 180—1)

This invention relates to improvements in motor vehicle, and the like, and particularly to a raising and traversing device therefor, and to improvements in the structure of such devices, and vehicles for their adaptation. An object of the present invention is to facilitate the parking of automobiles in congested districts, where parking space is limited or where automobiles are so closely spaced that it is difficult to approach the curb, or for maneuvering the car in restricted areas, or for raising the car for tire changes or other repairs, and especially to improve and simplify the construction and operation of such a device, with special reference to front wheel drive vehicles. A further object is to provide a vehicle construction adapted for the addition of such a device.

The device is shown by way of illustration in the accompanying drawing, in which:—

Figures 1, 2:
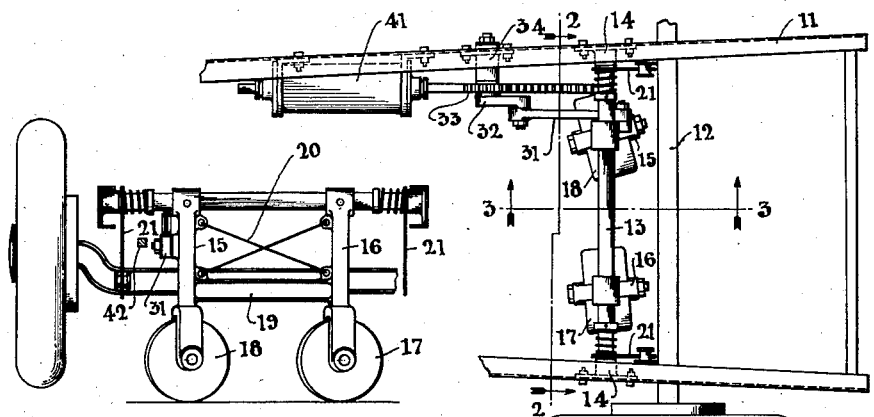
Fig. 1 is a plan view of the rear portion of a vehicle chassis incorporating the invention.
Fig. 2 is a rear view, partly in section, of the device illustrated in Fig. 1 taken through the section 2—2.

Referring to the drawing in detail and particularly Figures 1, 2, 3, and 4 in which like numerals of reference refer to corresponding parts. The vehicle frame 11 is attached to the rigid type rear axle 12 used in connection with front wheel drive cars, by the springs 10. The car to which this device is applied is driven from the front in this case and the traction at that end of the vehicle is utilized to raise the rear of the car on the auxiliary wheels.

The cross-shaft 13 is bearinged on the vehicle frame at bearings 14 which may provide vertically yielding movement, as described in my Letters Patent No. 1,742,566 issued January 7th, 1930. Shaft 13 carries arms 15 and 16 preferably rigidly mounted thereto, the lower ends of which are forked and adapted to rotatably support the wheels 17 and 18.

The arms 15 and 16 are preferably interconnected with links such as 19 and may further be braced by wires 20 or any other suitable means for adding rigidity to the structure.

The hooks 21 are adapted to engage the rear axle of the vehicle to effect its simultaneous raising with the frame or to provide means whereby the vehicle may be lifted through the rear springs 10 of the vehicle in a manner described in my copending application entitled "Vehicle raising and traversing device" filed April 30, 1931, Serial 533,944, issued October 25, 1932, No. 1,884,932.

The arm 15 is connected by means of a link 31 to an arm 32 which is rigidly attached to a gear 33, both of which are rotatably mounted in bearing 34 which is preferably firmly attached to the vehicle frame 11.

The fluid cylinder 41 is likewise attached to said frame and possesses a piston rod 42 slidably mounted therein, the piston rod being attached to a piston which is within the cylinder for actuating the same.

Tubes 45 and 46 communicate with the opposite ends respectively of the cylinder 41 and are associated through suitable valve means to a source of power such as the intake manifold vacuum of the vehicle motor not here illustrated. Said intake manifold being connected through suitable valve means controlled from the driver's compartment not here shown.

Figure 3:
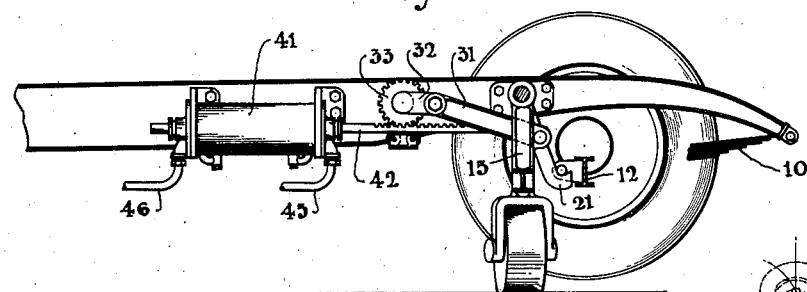
Fig. 3 is an elevation view partly in section through section 3—3 of Fig. 1.
Figure 4:
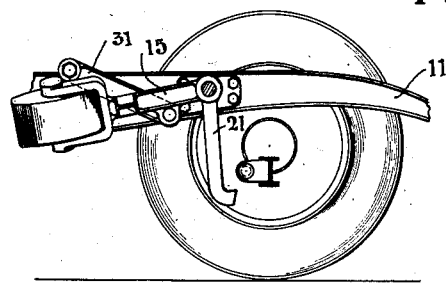
Fig. 4 is an elevation view of the device shown in Fig. 3 with the device in its inoperative position.

The piston rod 42 is provided with a series of rack teeth operatively associated with the teeth of the gear 33 whereby the longitudinal motion of the rod 42 rotates the gear 33 and consequently the arm 32 to the past center position illustrated in Fig. 3, with the vehicle raised on the auxiliary wheels or to the past center position illustrated in Fig. 4 with the wheel retracted to its inoperative position, with the arm 32 past center.

While this may be the preferred form, it is to be understood that the device may be raised and lowered by hand or other suitable means.

Figure 5:
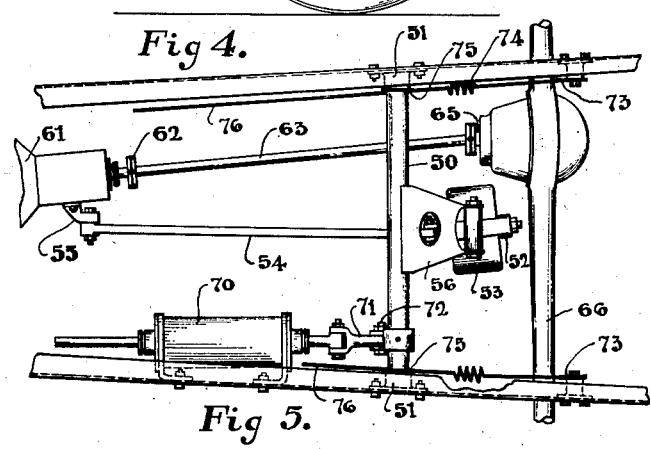
Fig. 5 is a plan view of an alternative type of construction which my invention might assume, illustrating a single wheel support and an offside drive shaft.

Fig. 5 illustrates an alternative construction and provides a shaft 50 rotatably mounted in the vehicle frame in bearings 51. The shaft 50 carries an arm 56 rigidly attached thereto, the end of which is pivotally attached to a lower toggle arm 52 which rotatably supports a wheel 53 in such a manner that the partial rotation of shaft 50 causes the wheel 53 to support the vehicle in a manner similar to that described in connection with my copending application entitled "Vehicle lifting and traversing device" filed May 6, 1931, Serial 535,380, issued October 25, 1932, No. 1,884,933. The radius rod 54 is attached to the lower toggle arm 52 and is pivoted to a point on the chassis, as illustrated, at the transmission bracket 55. This determines the arcuous path followed by the wheel in its vertical movement similar to that described in my copending applications above referred to.

The motor and transmission 61 of the vehicle are here illustrated as being set at an angle to the center line of the vehicle to minimize the action of the forward universal joint 62 of the vehicle drive shaft 63.

The pinion shaft 65 of this vehicle is illustrated as assuming an angle of 90 degrees relative to the axle 66, however, it may be in the same vertical plane as the drive shaft 63 by merely changing the face angle of the driving gears in the differential housing and the pinion mounting.

While the engine and transmission have been illustrated at a longitudinal angle to the center line of the vehicle they may be mounted in the conventional manner with the universal joint 62 taking care of this angularity.

The hydraulic cylinder 70 is preferably operated in a manner similar to that described in my above entitled copending application and is operatively associated with the shaft 59 through the rod 71 and the arm 72 which is firmly attached to the shaft 59. By this means a vehicle may be raised and lowered on a single support located directly under the center line of the vehicle at the rear and in front of the rear axle thereof. While the auxiliary wheel is here illustrated as set at an angle it may be transverse and driven from the vehicle driving means, as disclosed in descriptive form in the above referred to applications and patents, or in any other well known manner.

The hooks 73 operate to engage the axle through the springs 74 and the arms 75 of the shaft 59. The rod 76 extends forward to the front axle engaging means which effects the stability of the vehicle when one end is supported on a single wheel, as illustrated in my copending application entitled "Vehicle lifting and traversing device" filed May 6, 1931, Serial 535,380, issued October 25, 1932, No. 1,884,933.

Figure 6:
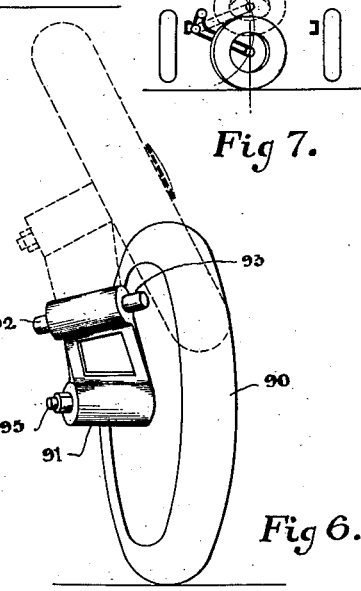
Fig. 6 is a diagrammatic elevation view of an alternative construction which my invention might assume incorporating the spare wheel of the vehicle for a supporting means, illustrating the wheel in its vehicle raised position in full line and in its inoperative position in dotted lines.

Fig. 6 diagrammatically illustrates a spare tire mounted for movement, whereby it may support the rear end of the vehicle in a vehicle raised position with the axis of said spare tire forming an angle with the central vertical longitudinal plane of the vehicle. The wheel 90 is mounted for rotation on an extension of a bracket 91 which is bearinged to the frame for rotation about the two ends 92 and 93. The member 91 being so formed that the axis of the shaft 95 and the ends 92 and 93 are out of plane and non-parallel to cause the vehicle wheel 90 to assume a lowered position, as described, and a raised position with the wheel axis in line with the longitudinal vertical center plane of the vehicle. The wheel may be operated in any conventional manner, as illustrated in my copending applications above referred to, and the various accessories necessary for its operation may be similarly connected.

Figure 7:
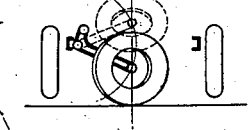
Fig. 7 is a diagrammatic view of the rear end of the vehicle illustrated in Fig. 6.

While I have illustrated the wheel being raised to the angular inoperative position relative to the vertical it is to be understood that this angle may be varied to any desired extent to comply with the lines of the car by varying the relation of the wheel axis relative to the body pivot or in any other manner depending on the construction used. The spare tire center always preferably lies on the vertical center line of the vehicle in both the active and inactive position, as illustrated in Fig. 7.

While I have described the device illustrated in Figures 1, 2, 3, and 4 as being raised and lowered by the cylinder 41 it is to be understood that the engine power may be utilized through the traction of the ground engaging wheels to further facilitate the raising and lowering of one end of the vehicle. The action of the cylinder 41 assisting this operation and causing the link 32 to assume and maintain its past center position in either the supporting or inoperative position. To further strengthen the pull on the piston rod 42 when the intake manifold vacuum is utilized as a source of power a check valve may be incorporated in the control line to maintain a higher vacuum in the open throttle position.

It is further to be understood that the off-side drive shaft 63, illustrated in Fig. 5, may be driven through a laterally displaced drive relative to the crankshaft, said drive being accomplished by suitable means, such as a chain or gears, preferably located between the engine fly-wheel and the universal joint 62, in which case the engine might be placed in line with the vehicle center line, with the drive shaft parallel to the crankshaft but disposed laterally thereto in the plan view of the vehicle. However, this drive shaft obviously will not be parallel to the crankshaft in the elevation view under all riding conditions, when the differential is carried by the axle, as illustrated.

While I have described and illustrated several embodiments of my invention it will be apparent to those skilled in the art that various changes, omissions, additions and substitutions may be made in the construction of the apparatus and that the apparatus may be put to uses other than those described without departing from the spirit of the invention as defined in the appended claims.

I claim as my invention:

1. A lifting and traversing device for a vehicle having means for partially raising and lowering said device, including a cylinder with a piston reciprocally mounted therein operatively associated with the intake manifold of the vehicle motor, and additional means including the traction of the wheels at the unelevated end of said vehicle, both said cylinder and said traction co-acting to effect the lifting or lowering at one end of said vehicle.

2. A lifting device for a vehicle supported by pivotal means to the chassis frame and of a length greater than the distance from the pivot point to the ground in the normal vehicle operating position, said device being capable of supporting one end of said vehicle from the ground, and being actuated into the vehicle lifted position partially by the rotation of the unelevated vehicle wheels, said device including means for lifting the axle of said vehicle at the elevated end of said vehicle, said device adapted to be raised and lowered by fluid pressure means, said fluid pressure means co-acting with the traction of the unelevated vehicle wheels to effect the lifting of one end of said vehicle.

BROOKS WALKER.

Patent No. 2,002,724                                                                Granted May 28, 1935

BROOKS WALKER

The above entitled patent was extended July 24, 1951, under the provisions of the act of June 30, 1950, for 6 years and 214 days from the expiration of the original term thereof.

*Commissioner of Patents.*